Dec. 8, 1925.  
P. A. SINGER  
1,564,979  
PROCESS OF MANUFACTURING STARCH PRODUCTS  
Filed Jan. 31, 1917
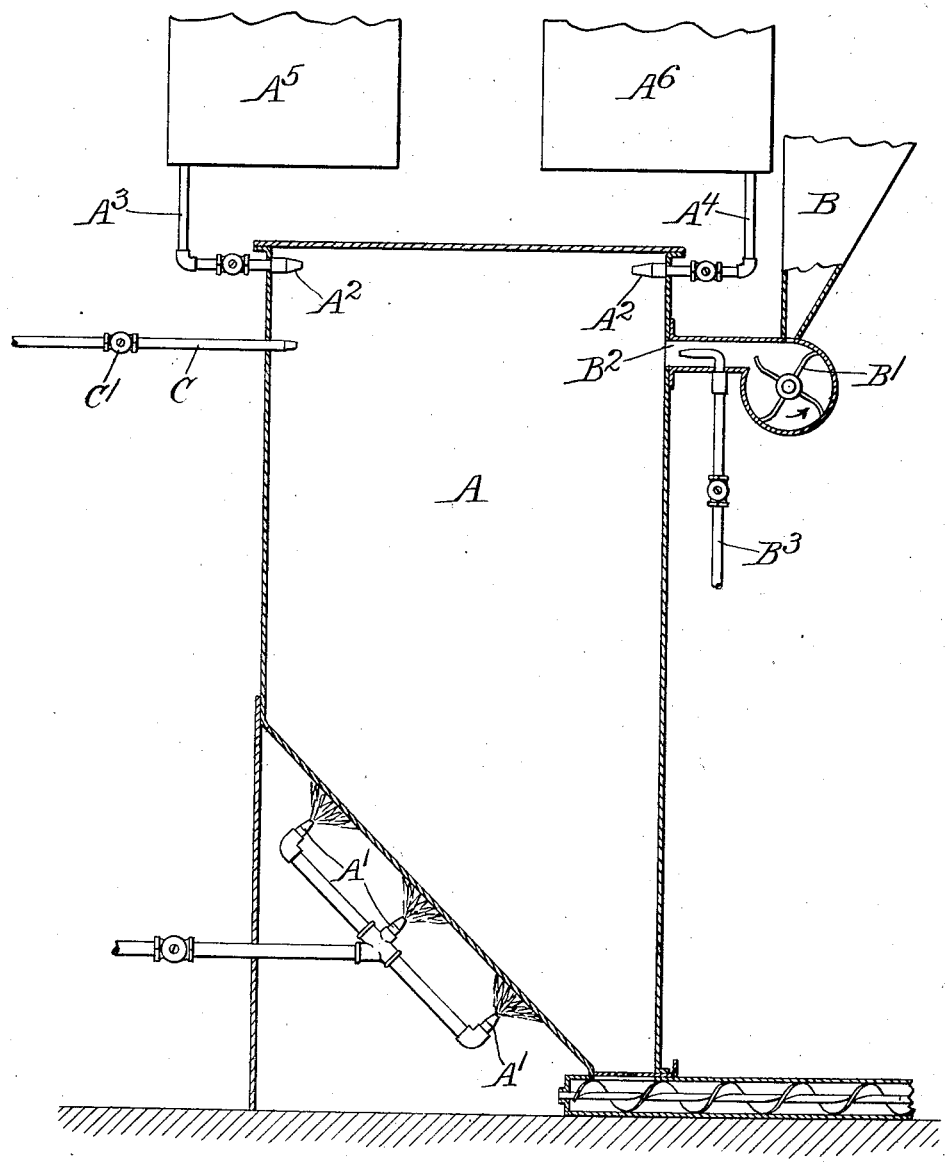

Patented Dec. 8, 1925.

1,564,979

UNITED STATES PATENT OFFICE.

PHILIP A. SINGER, OF MILWAUKEE, WISCONSIN.

PROCESS OF MANUFACTURING STARCH PRODUCTS.

Application filed January 31, 1917. Serial No. 145,600.

*To all whom it may concern:*

Be it known that I, PHILIP A. SINGER, a citizen of the United States, residing at Milwaukee, in the county of Milwaukee and State of Wisconsin, have invented a certain new and useful Improvement in Processes of Manufacturing Starch Products, of which the following is a specification.

My invention relates to the manufacture of starch products, of which the following is a specification, though it will of course be quite obvious that the process might be carried out in connection with many other materials and for many other different purposes, and that the starch process below described is merely to be taken as a very important exemplification of my invention and as an illustration in a more concrete form of the particular manner in which it works itself out in actual practice.

The invention relates to a process for the manufacture of what are commonly known as conversion products of starch which term includes modified starches such as laundry starches, or breakfast foods, soluble starches, dextrins, starch sugars, and mixtures of these various products. These products are formed by exposing starch to the action of various agents such as heat, moisture, pressure, and chemicals. These agents are used singly or in such combination as are necessary to produce the desired result. My invention involves the conditions under which this class of reactions takes place rather than agents by which they are brought about and while it is more readily applicable to certain of these processes its use facilitates the reaction and improves the product in the case of practically all the products with which I have experimented. All the methods heretofore used have certain inherent disadvantages. Dry methods such as are used for the preparation of dextrins, soluble starches, etc., are unsatisfactory because of the length of time required and the difficulty of making the reaction proceed uniformly in all parts of the dry mass even when the most efficient mixing devices available are used. The wet processes on the other hand such as are used for glucose are properly controllable only when sufficient water is present to render the mass freely fluid at the reaction temperature and in consequence the product at the end of the reaction contains a large excess of water whose necessary elmination is expensive and in many cases results in deterioration of the product.

My process escapes the objectionable features mentioned above and in addition enables the manufacturer to make starch products of nature and quality not heretofore possible.

My invention consists in brief in introducing both the starch and chemicals into the reaction space in the finest possible state of division, dust, mist or vapor, as the case may be. If a dry reaction is required, the starch is introduced in the form of a dust whose individual particles are single starch granules or of particles as nearly that small as possible. The reagents are introduced preferably in gaseous form or if their nature makes this impossible or impractical, they are introduced in solution under pressure through a suitable spraying device so that the solution enters the reaction chamber in the finest possible state of division—to wit—a mist. In case a wet reaction is necessary or desirable the starch is first made to a starch milk by merely mixing with water, or to a starch paste by boiling with water and is then introduced into the reaction chamber in the form of a mist, chemicals being introduced either in similar form or in gaseous state, or in mixture with the starch. It may be assumed from the law of mass action that such procedure should furnish ideal conditions for rapid and complete reaction without addition of excessive quantities of water and my experiments have demonstrated the accuracy of this assumption. An excellent example of the accelerating effect of an extremely fine state of division upon reactions of starch is found in the fact that starch when ignited in mass burns slowly, but when a suspension of starch dust in air is ignited the reaction proceeds with such rapidity as to cause violent explosions which not infrequently occur in starch plants.

The rapidity with which ordinary starch conversions proceed under the conditions of my invention is equally astonishing since reactions ordinarily requiring hours for their completion may by my method be accomplished in a very small fraction of that time.

As an example of my method or process as specifically applied to starch, one method by which I proceed is as follows:—

Corn starch is mixed with approximately ten times its own weight of water, and to it is added sufficient 18° Beaumé hydrochloric acid to give the mixture and acidity of one-tenth of one percent calculated as hydrochloric acid. The mixture is then brought to a temperture of 180° Fahrenheit and held at that temperature for sufficient length of time to completely gelatinize the starch, the whole mass being vigorously stirred during this period. It is then introduced into the reaction tank or chamber through a suitable spray nozzle in the form of a fine mist or spray. The reaction chamber is held at a temperature of 200° Fahrenheit or higher depending on the degree of conversion desired. The reaction is extremely rapid, and it is advisable to remove the finished product as rapidly as it is formed. At lower temperatures a larger proportion of soluble starch and dextrin is formed, and at higher temperature less or no soluble starch and more dextrin and sugars. It will be understood that the percentage of soluble starch, dextrin and sugars may be controlled by increasing and decreasing the amount of acid or other chemical agents as well as by thermal conditions.

As above pointed out it will be understood that my invention is not limited in its application to any specific class of starches as raw material or of agents for their treatment, nor to any specific class of starch conversion products.

Acids, alkalies, enzymes, gases such as nitrogen, ammonia, formaldehyde, or the halogens, steam, superheated steam, pressure heat, vacuum, or any other agents may be used as adjuncts to my method, and by its use corn, wheat, cassava or any of the starches may be transformed into laundry starch, dextrin, dextrose, breakfast foods, or any of the commercial starch products which involve changes in the starch molecule.

Where in the specification and claims I use the expression re-agent, I mean a substance which acts chemically upon the starch under treatment. Thus the use of an acid with a starch, produces a chemical re-action, whereas the use of air with a starch, produces a physical re-action.

In my process, therefore, it will be understood that I introduce into any suitable reaction chamber, a starch either in the form of a liquid or a dry powder, in such ways that it is more or less supported or floated in the atmosphere of the chamber. The separate starch particles form a dust preferably not larger than the individual starch granules. The dust is then treated by a reagent, and the reagent may be in the form of a liquid, a solid, a gas, any two forms, or all three forms together. If the starch is introduced as a liquid, or in a liquid, it will then be ordinarily dried, so as to leave it suspended in the atmosphere as a powder, even though it was originally introduced as a liquid, though this might under some circumstances not be essential, and it might be possible to leave the starch in a hydrated or liquid condition, suspended or floated in the atmosphere. The reagents may be introduced with the starch or may be separately introduced or some of them may be introduced separately and some with the starch, but, it is necessary that both the reagent and the starch no matter how it is introduced, or what their conditions be suspended in the air in such way that they can come into contact closely and intimately one with another while in a finely divided condition.

Obviously my process, inherently is an instantaneous process, because it is difficult to maintain even the finely divided materials as they are being treated, long in a suspended condition in the atmosphere, though by provision of fans, blowers or agitating means it is possible under some circumstances to keep them suspended for a long period. However, this is undesirable on account of its expense and I prefer to obtain the different conversions or modification products by changing the concentration of the reagent and the temperature at which reaction takes place, rather than by changing the time during which the reagents are in operation. It being understood of course, that particularly in the treatment of starch, the different products such as dextrins, soluble starch and sugar will result from treatment with the same reagent during periods of time, or the same reagent during the same periods of time at different temperatures, or the same reagent under different concentrations during the same period of time, or varying periods of time at different temperatures. In other words, the starch when treated by one reagent, as is well known, forms different products depending upon the time during which the treatment takes place, the temperature at which the treatment takes place and the concentration of the reagent and a variation of any one factor or both of them or all three of them may result in a variation of the product, and in my process I prefer to vary the temperature and the concentration rather than the time, although it is possible to and in cases I have preferred to vary the time, and it is understood that my process goes on while the starch is freely floating in a gaseous medium. The gaseous medium may be air, steam, or it may be something else or the reagent may be a gas and it may be freely floating in some other gaseous medium, such as for instance, air, superheated steam, nitrogen, illuminating gas or any other available gases, which may be used or available in connection with carrying out a process such as mine.

For the purpose of more clearly pointing out how my invention is carried out, I have illustrated it in the accompanying drawing, which shows diagrammatically an apparatus for carrying out the process.

A is a closed chamber adapted to be heated by the gas burners $A^1$, $A^2$, $A^2$ are a series of spray nozzles at the top of the chamber supplied by the means of pipes $A^3$, $A^4$, from storage reservoirs $A^5$, $A^6$ adapted respectively to contain a liquid reagent and a liquid carrying the starch.

If it is desired to dispense with one group or to dispense with the operation of one group of the spray nozzles, the two liquids may be mixed together and discharged through a single group of nozzles into the chamber.

B is a hopper adapted to contain the starch or other materials in solid form. $B^1$ is a propeller wheel and fan adapted to discharge the solid particles through the passage $B^2$ into the chamber. $B^3$ being a conduit communicating with such passage for a supply of air, or gas, when necessary to heat the chamber by means other than the gas burners shown. This conduit may also be used for the introduction of the reagent when it takes the form of a gas.

C is a steam supply pipe controlled by the valve $C^1$. Through it steam is adapted to be fed from a suitable steam source, not here shown, so as to provide an atmosphere of steam or superheated steam in the reaction chamber.

The apparatus shown is a very simple and diagrammatic one and means are provided for introducing starch and the reagent in any suitable manner and condition and for heating the chamber and the starch and the reagent in any suitable way at the will of the operator. When the process is completed, of course, the door is opened and the material is drawn off or if desired the spiral conveyor shown may be put into operation and the material drawn off by it from the bottom of the chamber in a continuous stream so that the process may be a continuous one.

It will be obvious that while the device which I have illustrated is operative, still it is in a sense diagrammatic and should be treated as such, merely exemplifying one way in which my process can be carried out, and I wish therefore that the drawing and discussion of them be regarded as in a real sense diagrammatic and not as a specific, particular illustration of the only type possible.

I claim:

1. The process of treating starch which consists in bringing together a liquid containing starch and a reagent, introducing them into the zone of treatment in a finely divided condition and causing the reagent to act upon the starch, while each is in a finely divided condition, and while the starch is freely suspended in a gaseous medium.

2. The process of treating starch which consists in bringing together a liquid containing starch and a reagent, introducing them into the zone of treatment in a finely divided condition, and causing the reagent to act upon the starch, while both the starch and the reagent are freely suspended in a gaseous medium.

3. The process of treating starch which includes projecting a liquid spray which contains starch into a highly heated reaction chamber in the presence of a reagent, and allowing the reagent to act upon the starch, while the minute starch bodies are suspended in a gaseous medium within the reaction chamber.

4. The process of treating starch which includes drying finely divided starch by projecting the liquid containing it into a highly heated reaction chamber in the presence of a reagent which acts chemically upon the minute starch bodies while they are suspended in the gaseous medium within the reaction chamber.

5. The process of producing dextrine which includes projecting into a highly heated reaction chamber a liquid spray which contains starch in the presence of a reagent which acts chemically upon the minute starch bodies while they are suspended in the gaseous medium within the reaction chamber.

6. The process of treating starch which includes projecting a liquid spray carrying starch particles into a highly heated reaction chamber, spraying a reagent that chemically acts upon the starch into the said chamber, the starch-carrying liquid and reagent being separately sprayed, and allowing the reagent to react upon the starch while the starch is suspended in the gaseous medium within the reaction chamber.

7. The method of drying a starch solution and simultaneously effecting a predetermined modification thereof, which includes subjecting such solution in finely divided form to the action of a current of gas capable of desiccating same and at a temperature capable of effecting the modification thereof and collecting the resultant dried and modified product.

8. The method of drying a starch solution and simultaneously effecting a predetermined modification thereof, which includes subjecting such solution in finely divided form to the action of a current of superheated steam, and collecting the resultant dried and modified product.

9. The method of producing dextrinous material from starch, which includes spraying a solution of starch in water into a current of superheated steam, thereby drying and converting the same and collecting the resultant dry dextrin.

10. The process of inverting starch and starch products which includes subjecting the said material to the action of an acid solution, spraying the solution carrying such products into a desiccating atmosphere of a temperature sufficiently high to volatilize the acid employed, and collecting the resultant dry product.

11. The method of drying a starch solution and simultaneously effecting a predetermined modification thereof, which consists in subjecting such solution in finely divided form to the action of a body of gas capable of desiccating same and at a temperature capable of effecting the modification thereof and collecting the resultant dried and modified product.

In testimony whereof, I affix my signature this 23rd day of January 1917.

PHILIP A. SINGER.